(12) United States Patent
Zimmer et al.

(10) Patent No.: US 7,751,120 B2
(45) Date of Patent: Jul. 6, 2010

(54) STEREOMICROSCOPE

(75) Inventors: Klaus-Peter Zimmer, Heerbrugg (CH);
Ruedi Rottermann, Berneck (CH);
Harald Schnitzler, Luechingen (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/332,903

(22) Filed: Dec. 11, 2008

(65) Prior Publication Data
US 2009/0086313 A1 Apr. 2, 2009

Related U.S. Application Data

(63) Continuation of application No. 11/467,815, filed on Aug. 28, 2006, now Pat. No. 7,605,975.

(30) Foreign Application Priority Data

Aug. 26, 2005 (DE) ........................ 10 2005 040 472
Aug. 3, 2006 (DE) ........................ 10 2006 036 300

(51) Int. Cl.
*G02B 21/00* (2006.01)
(52) U.S. Cl. ........................ 359/378; 359/368; 359/377
(58) Field of Classification Search .......... 359/368–390
See application file for complete search history.

(56) References Cited

U.S. PATENT DOCUMENTS

| | | | |
|---|---|---|---|
| 3,655,259 A | 4/1972 | Miyauchi et al. | |
| 3,909,106 A | 9/1975 | Buhler | |
| 4,341,435 A | 7/1982 | Lang et al. | |
| 4,447,717 A | 5/1984 | Nohda et al. | |
| 4,492,441 A | 1/1985 | Hopkins et al. | |
| 4,518,231 A | 5/1985 | Muchel et al. | |
| 4,605,287 A | 8/1986 | Lang et al. | |
| 4,697,893 A | 10/1987 | Fehr et al. | |

(Continued)

FOREIGN PATENT DOCUMENTS

CH           500 500          12/1970

(Continued)

OTHER PUBLICATIONS

Zimmer, K-P., "Optical Designs for Stereomicroscopes", in *International Optical Design Conference 1998*, Proceedings of SPIE, vol. 3482, pp. 690-697 (1998).

(Continued)

*Primary Examiner*—Thong Nguyen
(74) *Attorney, Agent, or Firm*—Leydig, Voit & Mayer, Ltd.

(57) ABSTRACT

A stereomicroscope of the telescope type includes a first beam path and a second beam path, wherein in the first beam path a first telescope system and in the second beam path a second telescope system are provided, wherein the magnifications of both telescope systems are equal and can be changed synchronously to each other, and wherein a common main objective is allocated to both beam paths. In order to increase the resolution without loss in depth of field, it is proposed that at least one optical element of the first telescope system has, compared to at least one corresponding optical element of the second telescope system, a different optically effective diameter.

17 Claims, 10 Drawing Sheets

U.S. PATENT DOCUMENTS

| | | | |
|---|---|---|---|
| 4,717,246 | A | 1/1988 | Fehr et al. |
| 4,786,154 | A | 11/1988 | Fantone et al. |
| 4,862,873 | A | 9/1989 | Yajima et al. |
| 4,989,078 | A | 1/1991 | Paxton |
| 5,009,487 | A | 4/1991 | Reiner et al. |
| 5,603,687 | A | 2/1997 | Hori et al. |
| 6,546,208 | B1 | 4/2003 | Costales |
| 6,563,113 | B1 | 5/2003 | Amann et al. |
| 6,614,595 | B2 | 9/2003 | Igarashi et al. |
| 6,661,572 | B2 | 12/2003 | Spink et al. |
| 6,816,321 | B2 | 11/2004 | Zimmer et al. |
| 2003/0210470 | A1 | 11/2003 | Zimmer et al. |
| 2003/0227672 | A1 | 12/2003 | Zimmer et al. |
| 2004/0085628 | A1 | 5/2004 | Kawasaki et al. |
| 2004/0091259 | A1 | 5/2004 | Hanzawa |
| 2004/0217259 | A1 | 11/2004 | Yoneyama et al. |
| 2005/0168809 | A1 | 8/2005 | Moller et al. |
| 2007/0047072 | A1 | 3/2007 | Zimmer |
| 2007/0047073 | A1* | 3/2007 | Zimmer et al. ............... 359/377 |
| 2008/0030848 | A1 | 2/2008 | Zimmer |

FOREIGN PATENT DOCUMENTS

| | | |
|---|---|---|
| DE | 10222041 | 12/2003 |
| DE | 10225192 | 1/2004 |
| DE | 102004006066 | 8/2005 |
| EP | 1010030 | 6/2000 |
| EP | 1235094 | 8/2002 |
| WO | WO-9913370 | 3/1999 |

OTHER PUBLICATIONS

W. Klein, "Einige optische Grundlagen zu Vario-Systemen", Jahrbuch fuer Optik and Feinmechanik, 1972, Pegasus, Wetzlar, p. 63.

Co-pending U.S. Appl. No. 11/467,815, filed Aug. 28, 2006, entitled "Stereomicroscope".

Co-pending U.S. Appl. No. 11/467,455, filed Nov. 27, 2006, entitled "Stereomicroscope".

Co-pending U.S. Appl. No. 11/467,447, filed Aug. 25, 2006, entitled "Greenough-Type Stereomicroscope".

Notice of Allowance mailed Jan. 30, 2009 in co-pending U.S. Appl. No. 11/467,455.

Non-Final Office Action mailed Feb. 13, 2009 in co-pending U.S. Appl. No. 11/467,815.

Zimmer, K.-P., "Optical Designs for Stereomicroscopes", in International Optical Design Conference 1998, Proceedings of SPIE, vol. 3482, pp. 690-697 (1998).

Brochure "OMI VISU 200 am Bodenstativ S8 Ophathalomologie unter neuen Aspekten", Operationsmikroskope von Carl Zeiss, pp. 1-4, Apr. 1989.

Brochure "SteREO Die neue Groesse", Mikroskopie von Carl Zeiss, pp. 1-6, Sep. 2004.

* cited by examiner

Fig. 1

Prior Art

Prior Art

STEREOMICROSCOPE

CROSS REFERENCE TO RELATED APPLICATIONS

This application is a continuation application of U.S. patent application Ser. No. 11/467,815, filed on Aug. 28, 2006, which claims priority to German Patent Application No. DE 10 2005 040 472.3, filed Aug. 26, 2005, and to German Patent Application No. DE 10 2006 036 300.0, filed on Aug. 3, 2006, both of which are incorporated by reference herein.

FIELD

The present invention relates to a stereomicroscope. The stereomicroscope can be designed according to Greenough with, in each case, one objective per stereo channel, or as a telescope type with a main objective common for both stereo channels. The stereomicroscope is detachably connected to a focusing arm or incorporated therein.

BACKGROUND

Stereomicroscopes are used to manipulate objects under visual observation and/or to make fine object details visible. The object manipulation preferably takes place under low magnification and requires good 3D reproduction. For detail recognition, rapid switching to high magnifications with high resolution is desired without change of instrument.

Stereomicroscopes provide two views of the object at various observation angles which are perceived by the viewer as a three dimensional image of the object. If the angle between the two observation directions is unusually large, the object appears spatially distorted.

Numerous descriptions of the telescope type of stereomicroscopes appear in the literature: see "Optical Designs for Stereomicroscopes", K-P. Zimmer, in International Optical Design Conference 1998, Proceedings of SPIE, Vol. 3482, pages 690-697 (1998). The U.S. Pat. No. 6,816,321 discloses an afocal zoom system for high performance stereomicroscopes with which zoom factors z (ratio of maximum to minimum zoom magnification) of more than 15 can be achieved.

Stereomicroscopes with such a design include—apart from optional bolt-on modules—a main objective, which images the object at infinity, two downstream parallel telescopes for varying the magnification and two observation units (binocular tubes) comprising a tube lens, inverting system and eyepiece for visual observation with both eyes. The telescopes can be designed as Galilean telescopes for step-by-step magnification selection or as afocal zoom systems for continuous magnification selection. According to the prior art, two identical telescopes are arranged symmetrically to a plane of symmetry of the device, wherein the plane of symmetry divides the object symmetrically into a right and a left half. The distance between the telescope axes is referred to as the stereo basis. The numerical aperture of this microscope is given by the semi-diameter of the entrance pupil of the telescope or spy glass divided by the focal length of the main objective.

The numerical aperture of a microscope of this type is therefore limited in the prior art. In order to increase the numerical aperture it is known to expand the entrance pupil diameters of the telescopes which, because of the arrangement of the two telescopes next to each other, results in an expansion in the stereo basis and therefore in the drawback of large equipment dimensions, or to shorten the focal length of the main objective, thereby disadvantageously reducing the working distance and increasing the power required of the main objective excessively. In both cases the angle between the directions of observation is expanded, resulting in, or increasing, spatial distortion.

U.S. Pat. No. 5,603,687 describes an asymmetrical stereooptic endoscope, in which two objective systems with different diameters of the entrance pupils are arranged parallel next to each other. Both objectives produce images of the object on a sensor surface via light conductors or light fibers. From these CCD sensors for example, the image data are transmitted after digital processing to a monitor, that is to say they can be spacially perceived for example with a stereomonitor. It is stated that despite varying diameters of the two endoscopic channels the viewer perceives a stereoscopic image with a resolution and a brightness, as they result from the channel of larger diameter. The second channel of smaller diameter primarily serves to produce a stereoscopic vision or impression.

The conditions in the case of a stereomicroscope of the telescope type of the design as described above are in principle different than in the case of an endoscope in accordance with U.S. Pat. No. 5,603,687. Firstly, the viewing of the object takes place as a rule (at least also) directly with the eyes, without prior digital processing. Such digital processing will or can be used, if additionally documentation is to be made via connected cameras. It is not clear from the US document mentioned, how in the case of the embodiment described therein an object can be viewed directly visually. Furthermore, the projection onto a sensor surface (fixed focus) limits the depth of field of the display since the accommodation capacity of the eyes is out of action.

The magnification of an endoscope depends on the object distance. At high magnifications the object distance is normally minimal. In this case the overlap range of the fields of view of the two objectives being arranged next to one another is minimal. Therefore, stereoscopic viewing, which is only possible in the overlap range, is reduced in this case. At low magnifications however the overlap is large, but the numeric aperture is small, which results in high depth of field. Hence it follows that the image definition or quality of 3D objects only reduces slowly with the distance to the focus plane. This circumstance favours the merging of the two fields into a spatial image, in particular if the object depth is less than the depth of field.

A main component of a stereomicroscope of the type described is the telescope systems (discrete magnification changer or continuous zoom) in the two stereo channels. Telescope systems are not common in endoscopy. In the US document mentioned, therefore, a variation of the display scale or reproduction scale is not discussed.

For stereoscopic viewing the depth of field is important. In contrast to the stereoendoscope described above high power stereomicroscopes of the telescope type advantageously use the accommodation capacity of the eyes. A magnification variation takes place without changing the focusing of the equipment. There is no difference in the object clip between the right and the left field over the whole magnification range. The numeric aperture and thus the resolution of the stereomicroscope are adapted to the magnification and prevent empty magnifications. At high magnifications the depth of field is very small, in many cases smaller than the object depth in such arrangements. The image quality of 3D objects therefore considerably decreases with the distance to the focus plane. Thus, it cannot be assumed that the merging of the fields to a spatial image observed with a stereoendoscope under typically low magnification and high depth of field can be transferred to the conditions, which exist with a high power microscope in particular at high magnifications, if the stereoscopic channels due to different apertures produce images of different resolution and depth of field.

A further, not to be neglected, criterion is that of the image brightness, which is different in the case of the US document mentioned, due to the different entrance pupil diameters of the endoscopic channels. Here the digital processing of images has the advantage that both fields can be shown equally brightly on the monitor after corresponding correction. Such corrections are not possible in the case of direct visual viewing, as is the case with stereomicroscopes.

Furthermore, it would be detrimental with an arrangement discussed above, if the higher power of one of the stereoscopic channels could not be used by a user having eyes of different capability, if the stereoscopic channel of higher power was assigned to the eye of lower capability.

U.S. Pat. No. 3,655,259 describes a somatic microscope, which is to be used as an endoscope. This microscope has been developed as a stereomicroscope from the Greenough type. The two stereo channels are arranged at a given opening angle to one another and in each case possess their own objectives, which are designed here as mini lenses, rod lenses or as final sections of a glass fibre. The underlying problem with this somatic microscope of this document is due to the fact that with the use of two objectives these cannot be placed arbitrarily close to each other, since a lens combination is selected as the objective and the use of a single objective lens is not possible due to increasing spherical aberrations, in particular if high magnification is required. The object of the document mentioned is therefore to find an arrangement which permits minimum endoscope diameter at high magnification.

U.S. Pat. No. 4,862,873 describes a further stereoendoscope which comprises two channels arranged parallel to each other, wherein one of the channels is to be used for lighting and the other is to be used for observation respectively. In order to produce a stereoscopic image impression the two channels are switched over by a motorized prism 30 times per second for example.

German Patent DE 102 25 192 B4 describes an arrangement for an objective for stereomicroscopes of the telescope type as well as a corresponding stereomicroscope. The design, functional mode as well as the interrelationships of magnification, resolution power and vignetting, thereof are incorporated herein by reference.

SUMMARY

An object of the present invention is to provide a stereomicroscope with improved detail recognition compared with conventionally designed stereomicroscopes, without this leading to an increase in the construction volume of a stereomicroscope or to limitations in the usability of the conventional working range of a stereomicroscope. A further or alternate object of the present invention is improving the detail recognition without detrimentally reducing the depth of field.

The present invention provides a stereomicroscope of the telescope type comprising a first beam path and a second beam path, wherein in the first beam path a first telescope system and in the second beam path a second telescope system are provided, wherein the magnifications of both telescope systems are equal and can be changed synchronously to each other and wherein a common main objective is allocated to both beam paths, characterised in that at least one optical element of the first telescope system compared with at least one corresponding optical element of the second telescope system has a different optically effective diameter.

BRIEF DESCRIPTION OF THE DRAWINGS

Exemplary embodiments of the invention are described below and shown schematically in the drawings, in which.

DETAILED DESCRIPTION

It is advantageous for the stereomicroscopes according to the invention on the one hand to have at low magnifications as a result of a low numerical aperture a large depth of field and to allow a good 3-dimensional reproduction and on the other to have at high magnifications a high aperture and thus to offer high resolution without generating empty magnifications, that is to say rising magnifications without increasing resolution.

Surprisingly it has been shown that despite the different resolution and depth of field due to the different optically effective diameters of the two stereoscopic channels or beam paths the visual image impression is not impaired even at high magnifications.

With one embodiment, in which the optically effective diameters of both stereoscopic channels are different for all magnifications, on the one hand the higher depth of field of the smaller of the two channels and on the other hand the higher resolution of the larger of the two channels are always perceived. As the result of expansion of the optically effective diameter of the one channel in relation to the prior art an increase in the resolution and thus in the detail recognition without a disadvantage as regards the depth of field can be achieved. This advantage is particularly useful for setting high magnifications.

With another embodiment, in which the optically effective diameters of the smaller stereoscopic channel are limited for example by a lens diameter, both stereoscopic channels can be implemented in a wide magnification range of low magnifications with the same effective diameter, for which reason the stereomicroscope in this setting works just like a conventional microscope. Only at high magnifications, when the diameter of the entrance pupil of the larger channel exceeds the diameter of the limiting lens mentioned of the smaller channel, the apertures become asymmetric and the effects described above are realized.

Furthermore, it is pointed out that the differences in the image brightnesses of the two channels, as generally known, correspond to the ratio of the surfaces of the entrance pupils. In the first embodiment mentioned above the brightness differences are constant throughout the entire magnification range, in the second above exemplary embodiment brightness differences only occur at high magnifications.

Also, the resulting brightness differences do not lead to visual impairment over the entire working range of the stereomicroscope. Thus, the advantages of different channel diameters with the stereomicroscope according to the invention can be used as a function of the magnification, without the disadvantages of these different channel widths impairing the direct visual viewing of the image. Such a reaction was not automatically to be expected.

A stereomicroscope according to the invention comprises a first beam path and a second beam path, wherein in the first beam path a first telescope system and in the second beam path a second telescope system are arranged, wherein the magnifications of both telescope systems are equal and can be changed synchronously to each other, and wherein a common main objective is allocated to both beam paths. At least one optical element of the first telescope system has, compared with at least one corresponding optical element of the second telescope system, a different optically effective diameter.

The optical elements of the first telescope system or the second telescope system are lens elements or diaphragms. For at least one magnification setting or one zoom or magnification range—preferably at high magnifications—for the same magnification of the telescope system the diameter of an entrance pupil of the first telescope system is more than 10%, in particular 10% to 50%, larger than the diameter of the entrance pupil of the second telescope system.

The first telescope system has formed an optical axis and the second telescope system has formed an optical axis parallel to this, wherein the distance between the optical axes of the telescope systems results in a stereo basis. It is advantageous if the diameter of the entrance pupil of the telescope system with the larger optically effective diameter is larger than the stereo basis. This permits a compact structure despite different diameters of the stereoscopic channels.

It has been shown that different arrangements of the main objective in relation to the two telescope systems of a stereomicroscope according to the invention are possible and expedient.

A first embodiment of the main objective is to be called a "symmetrical arrangement" below. With this embodiment the distances of the optical axis of the main objective to the two optical axes of the telescope systems are equal. This embodiment is described in more detail further below in connection with the exemplary embodiment in FIG. 8a. It is seen as an advantage that an object, which is placed centrically to the main objective, is viewed through both stereoscopic channels at the same opposite angle, whereby the impression of a perpendicular view from above arises. However, the relatively large diameter of the main objective, which principally causes higher costs for an objective optically corrected accordingly, has a disadvantageous effect.

An alternative embodiment is the "asymmetrical arrangement", in which the distances of the optical axis of the main objective to the optical axes of the two telescope systems are of various lengths. Here the distance of the optical axis of the main objective to the optical axis of the telescope system with the larger optically effective diameter is smaller than the distance to the optical axis of the other telescope system. This embodiment will be discussed in more detail further below in connection with the exemplary embodiment in FIG. 8b. With this embodiment the diameter of the main objective can (only) be selected as large as the sum of the diameters of the two stereoscopic channels. This, in comparison with the symmetrical arrangement, leads to a main objective of smaller diameter with the lower costs and higher optical quality associated therewith. The only disadvantage, in practice of little significance is the fact that an object, placed centrically to the main objective, for example a needle, appears as though viewed slightly from the side.

Figure 8A:
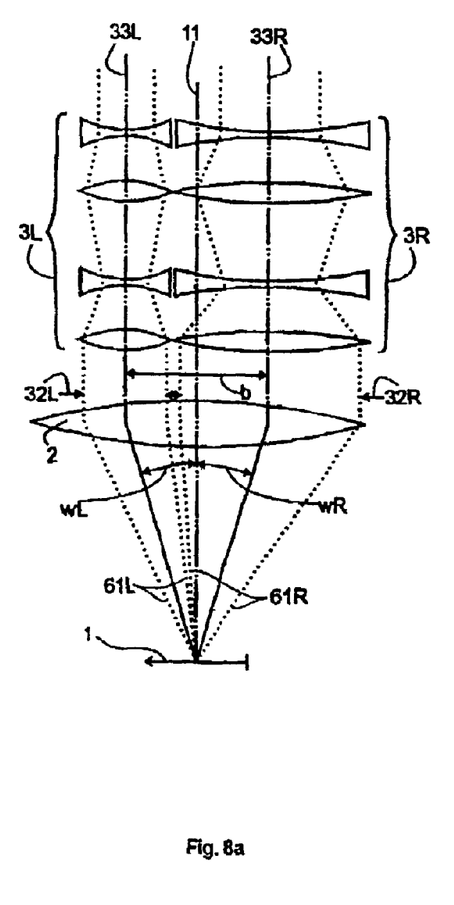
FIG. 8a shows a first setting possibility of the positioning of the main objective in relation to the magnification changer ("symmetrical arrangement")
Figure 8B:
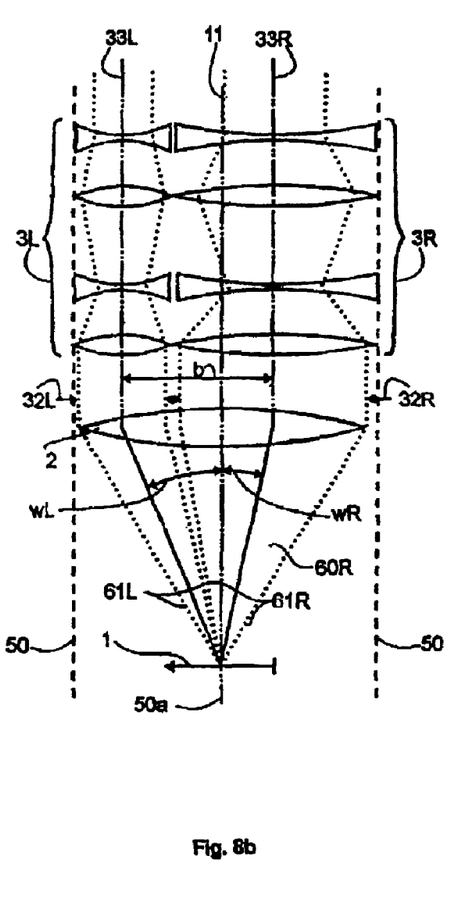
FIG. 8b shows the positioning of the main objective in such a way that the optical axis of the main objective is closer to the optical axis of the telescope system of the greater diameter of the entrance pupil ("asymmetrical arrangement")
Figure 8C:
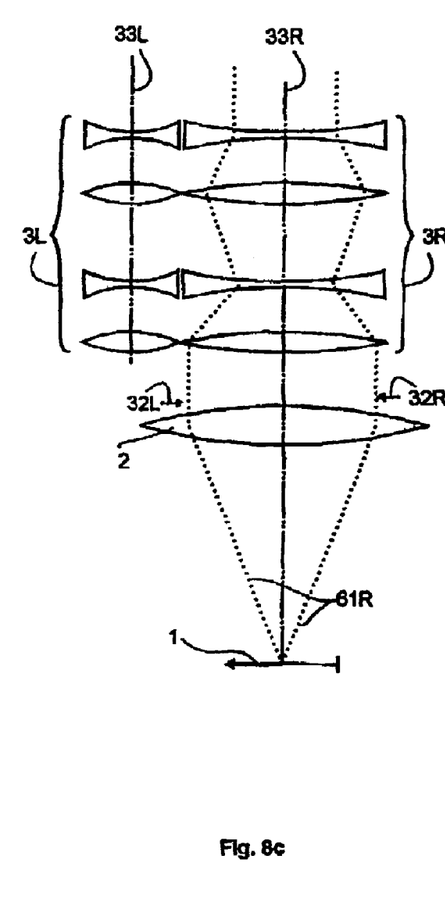
FIG. 8c shows the special case in which the optical axis of the main objective and the optical axis of the telescope system coincide with the larger entrance pupil diameter ("centric arrangement")

A further embodiment, which is described in more detail further below in connection with the exemplary embodiment in FIG. 8c, is a "centric arrangement", in which the optical axis of the main objective coincides with the optical axis of the telescope system with the larger optically effective diameter. This embodiment is selected if stereoscopic viewing is not required, in particular, if images of high magnification and high resolution are to be sent to a documentation interface for example. In this connection it has proven advantageous to displaceably arrange the main objective laterally relative to the telescope systems (thus perpendicularly to its optical axis) in order to be able to easily change over between different arrangements. In practice it has proven expedient to laterally displace the telescope systems with the tube in relation to the stationary main objective in order to prevent a shifting or displacement of the object. Only for the sake of simplicity should mention be made of "lateral displaceability of the main objective".

Lateral displaceability of the main objective is expedient concerning the different arrangements mentioned at least in the direction of the stereo basis. However, lateral displaceability can also be advantageous in a different direction (thus not only in the direction of the stereo basis, but for example in a direction perpendicular to this) in particular if the lighting channel used for illumination does not coincide with the two viewing channels (that is to say the first and second beam path). EP 1 010 030 (WO 99/13370) discloses a stereo fluorescence microscope, which additionally to the two stereoscopic channels in the magnification changer comprises a third channel outside the stereo basis, which serves to illuminate the object from above. As to be inferred there from FIG. 2b a lateral displacement of the main objective perpendicular to the stereo basis is advantageous, in order to encompass with a small objective diameter all three channels of the stereo fluorescence microscope mentioned.

Further advantageous embodiments of the invention can be found in the claims and the following exemplary embodiments.

Figure 1:
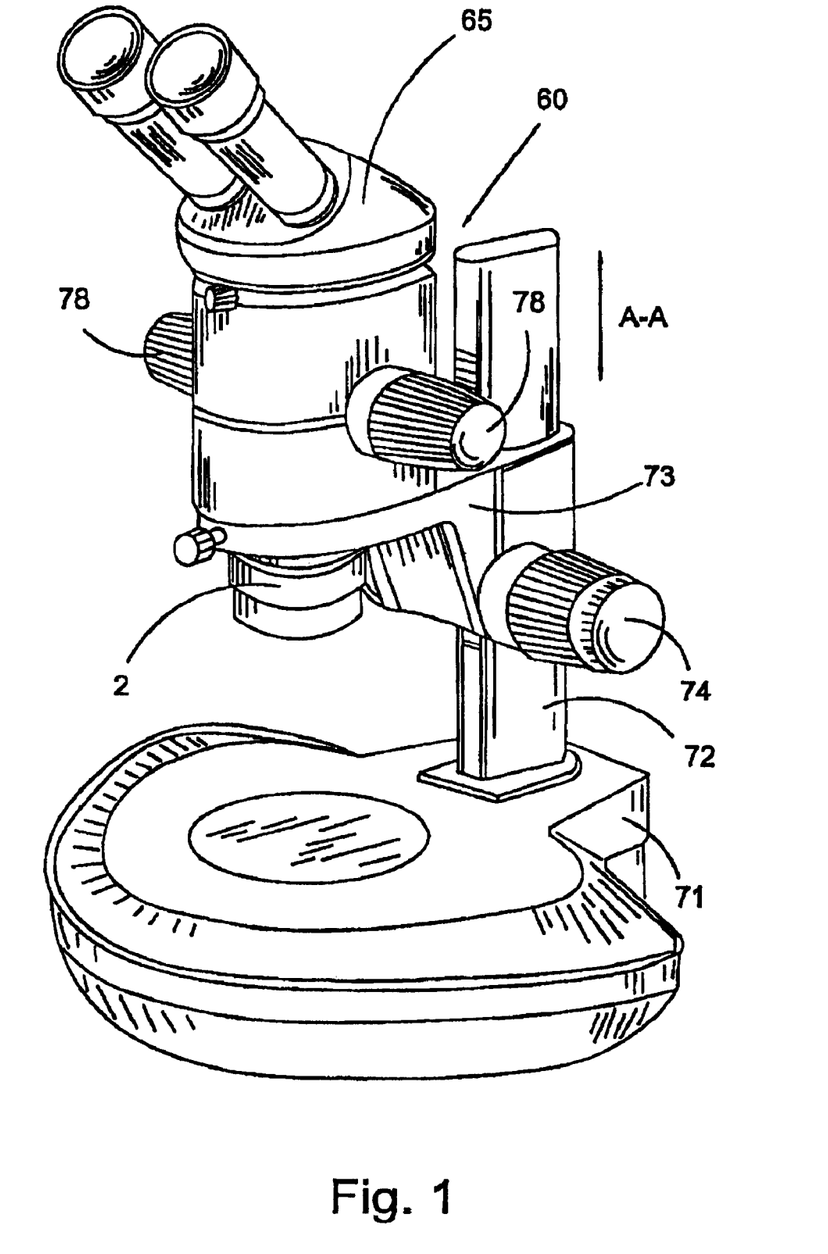
FIG. 1 shows a perspective view of a stereomicroscope.

FIG. 1 is a perspective view of a stereomicroscope 60 according to the prior art. The stereomicroscope 60 comprises a base 71, to which a focusing column 72 is secured. A focusing arm 73 is attached in a displaceable manner to the focusing column 72, which can be displaced via adjustment element 74 along the double arrow A-A. The stereomicroscope 60 has a binocular tube 65 and a zoom system (see FIG. 2). The zoom system can be adjusted with adjusting elements 78.

Figure 2:
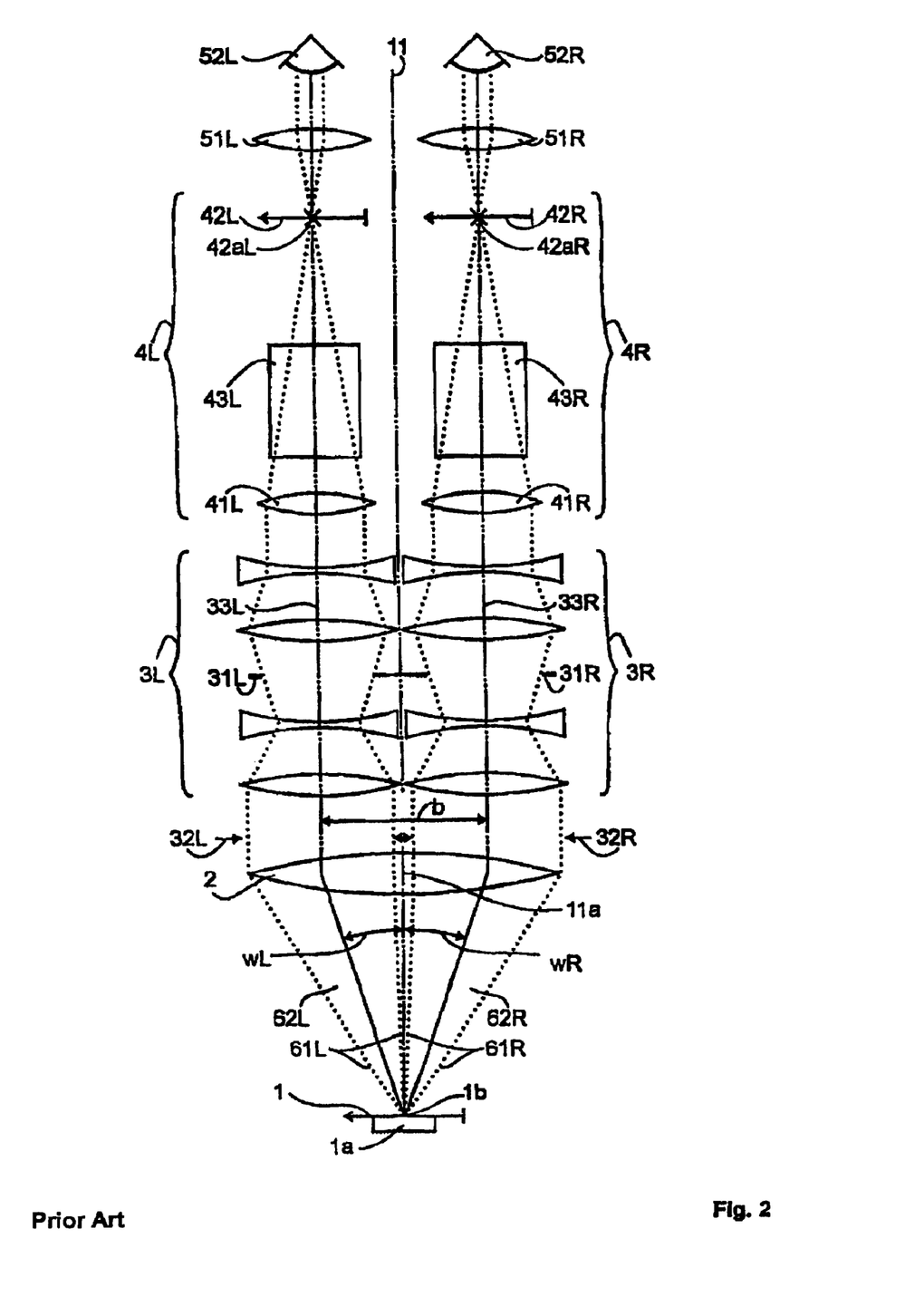
FIG. 2 shows a schematic diagram of the optical design of a stereomicroscope of the telescope type according to the prior art.

FIG. 2 is a schematic diagram of the optical design of a stereomicroscope of the telescope type according to the prior art (see DE 102 25 192 B4). The object plane 1 is in the front focal plane of the main objective 2. The object 1a to be investigated or observed is also located in the object plane. In the object plane 1 the object centre 1b is marked by the vertical line 11. The optical axis 11a of the objective 2 coincides with the vertical line 11. In the following the embodiment of the design of the optical system will be described in the direction of a user. The user detects the image of the object 1a with his eyes 52R and 52L. The main objective 2 has a first and second telescope system 3R and 3L downstream, which are identical in design. The first and second telescope systems 3R and 3L are arranged symmetrically to the vertical line 11 or to the optical axis 11a. The telescope systems 3R and 3L are shown as afocal zoom systems. These systems are, for example, described in U.S. Pat. No. 6,816,321 mentioned (corresponds to DE 102 22 041 B4).

In the zoom systems diaphragms or iris diaphragms 31R and 31L are arranged. The diameters of the iris diaphragms 31R and 31L are adjustable and are set the same way on both sides. These limit the diameters 32R and 32L of the entrance pupils, which are of variable size according to the zoom setting and diaphragm selection but are the same on both sides.

The first and second telescope systems 3R and 3L define a first and a second optical axis 33R and 33L respectively. The distance between the optical axes 33R and 33L is referred to as the stereo basis b. On the first and second optical axes 33R and 33L the telescope systems 3R and 3L are subordinate to the first and second observation units 4R and 4L, which are each arranged symmetrically to the vertical line 11. The first and second observation units 4R and 4L comprise identically designed tube lenses 41R and 41L, which generate the intermediate images 42R and 42L, symmetrical inverter systems 43R and 43L for image erecting and eyepieces 51R and 51L. The user detects the image of the object directly with his eyes 52R and 52L. Optionally in a known fashion further modules can be introduced into the beam path, such as attachment lenses, filters, polarisers, reflected illumination units, beam splitting systems for light coupling and decoupling, and so on.

The display by a microscope of this kind is shown by a schematic representation of the marginal beams 61R and 61L of a beam path, which in the example originates from the object centre 1b. The marginal beams 61R and 61L identify the two illuminating pencils 62R and 62L used by the microscope. As shown on FIG. 2, the respective illuminating pencils 62R and 62L are limited by the diameters 32R and 32L of the entrance pupils, which for their part are determined by the iris diaphragms 31R and 31L. Since the object 1a is arranged in the front focal plane of the objective 2, the marginal beams run parallel between the objective 2 and the zoom. Therefore it is possible in a simple manner to determine the diameters 32R and 32L of the entrance pupils. The marginal beams leave the zoom parallel again. Therefore the space behind the zoom is advantageous for optional accessories. The tube lenses 41R and 41L each focus the pencil of rays on a point 42aR and 42aL in the plane of the intermediate images 42R and 42L, respectively. The points 42aR and 42aL are located in the front focal plane of the eyepiece 51R or 51L and is imaged by this at infinity, so that it can be observed with the eyes 52R and 52L. Further, it can be seen from FIG. 2 that the angles wR and wL at which the observer perceives the object 1a with the right or left eye 52R, 52L, are the same.

As stated in U.S. Pat. No. 6,816,321 ("Afocal Zoom for Use in Microscopes") and in DE-102 25 192 B4 ("Objective for stereomicroscopes of the telescope type") the resolution of the microscope is given approximately by:

$$\text{Resolution} = 3000 \ast nA \; [Lp/mm], \qquad \text{Equation (1)}$$

where LP/mm stands for line pairs per millimeter and nA is the numerical aperture which in the present case is given by $$nA = EP/(2 \ast \text{focal length of the objective 2}) \qquad \text{Equation (2)}$$

where EP is the diameter of the entrance pupil of the telescope system.

Finally the depth of field T is again of significance. A practical ratio is given by:

$$T \; [mm] = \lambda/(2 \ast nA^2) + 0.34 \; mm/(V\text{tot} \ast nA) \qquad \text{Equation (3)}$$

where $\lambda$=light wavelength of approx. 550E-6 mm and Vtot=microscope magnification including eyepiece magnification.

Figure 3:
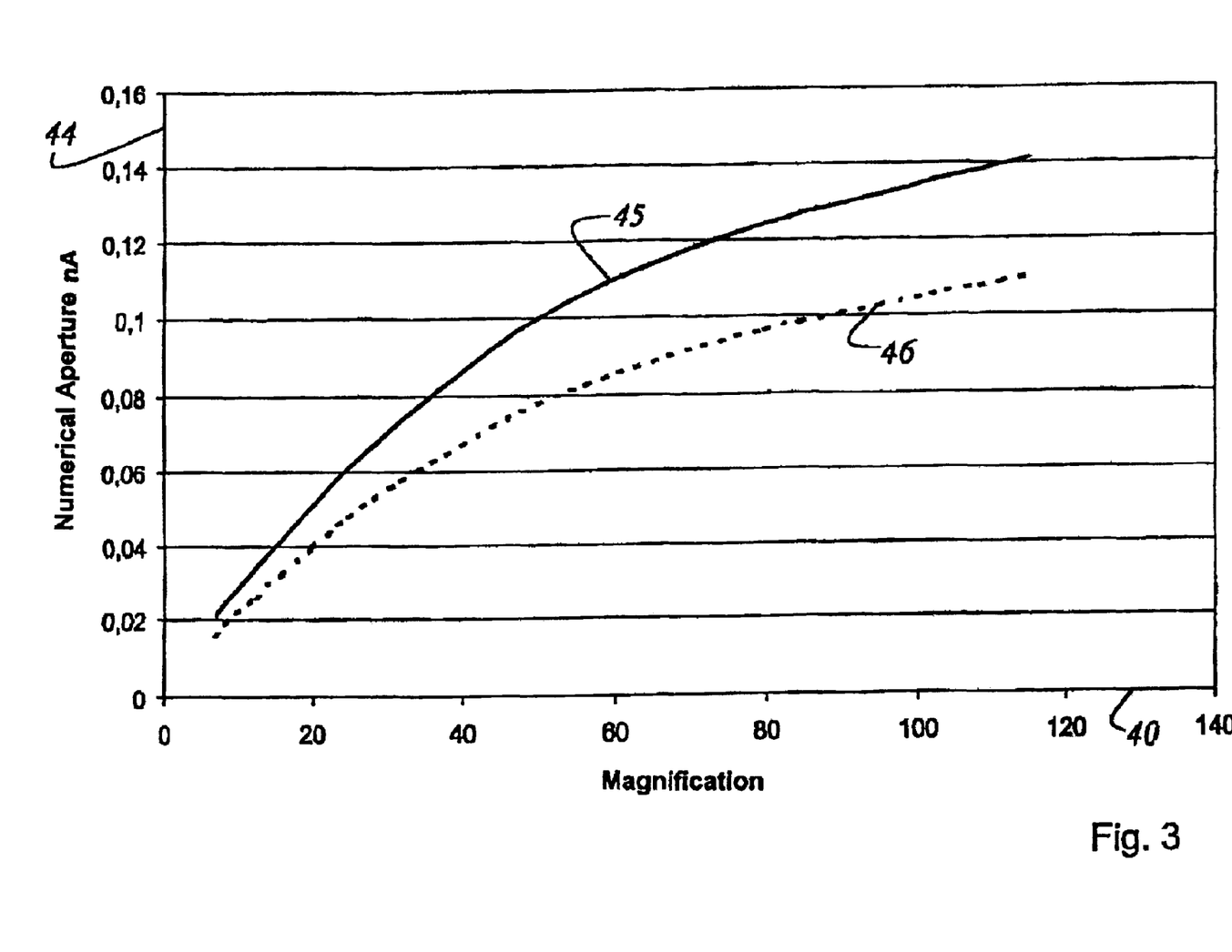
FIG. 3 shows the progression of the numerical aperture nA for a typical high power stereomicroscope as a function of the magnification.

FIG. 3 shows the course of the numerical aperture nA for a typical high power stereomicroscope as a function of the magnification. The magnification is plotted along the abscissa 40. The numerical aperture nA is plotted along the ordinate 44. In this example a focal length of the main objective $f_o'$=80 mm, a tube focal length $f_T'$=160 mm, a stereo basis b=24 mm and an eyepiece magnification=10× are selected. The unbroken line 45 corresponds to the full diaphragm opening and the broken line 46 results if the diaphragm surface is reduced by 40%.

Figure 4:
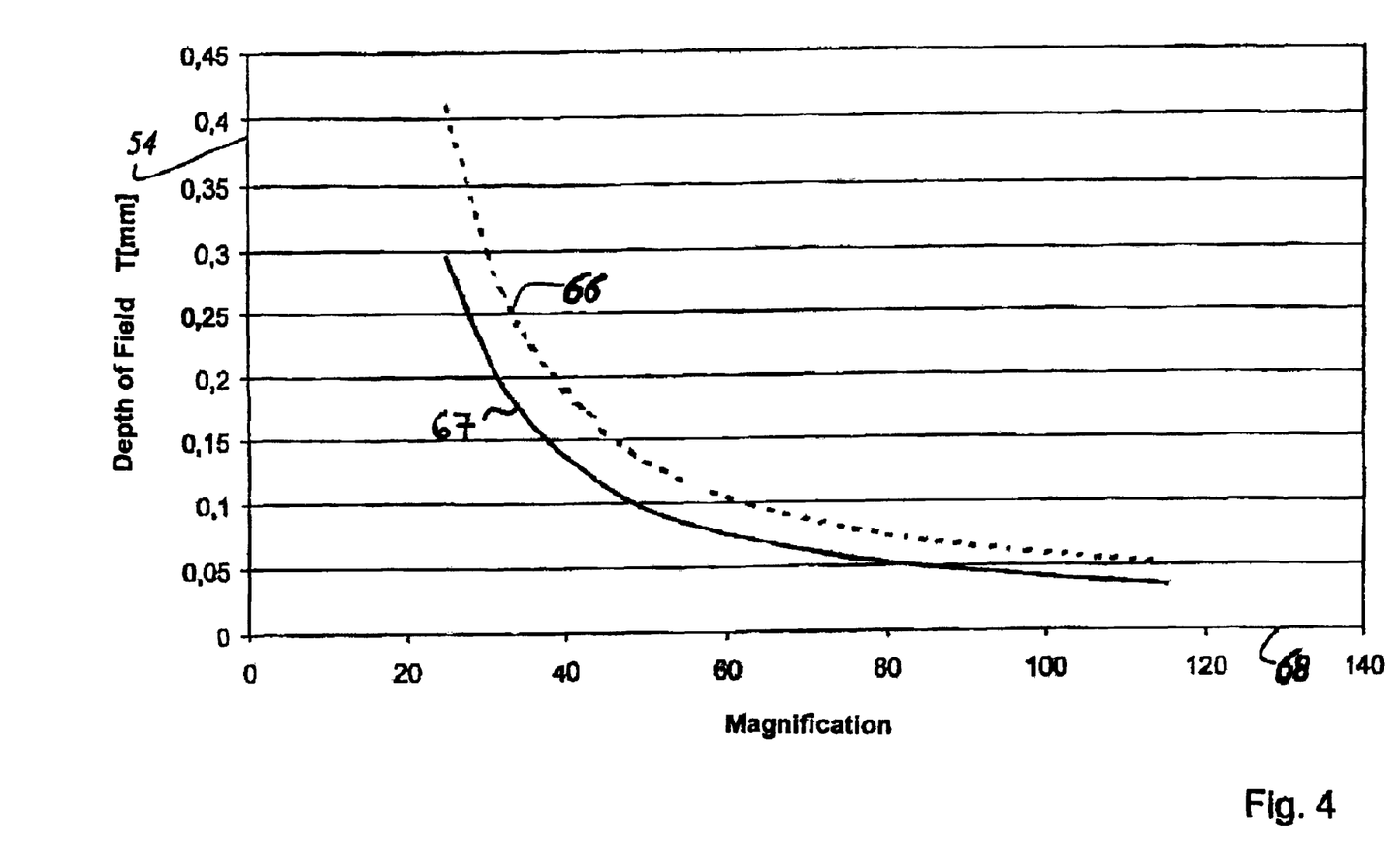
FIG. 4 shows the progression of the depth of field T for the high power stereomicroscope described above as a function of the magnification.

FIG. 4 shows the course of the depth of field T for the high power stereomicroscope described above as a function of the magnification. The magnification is plotted on the abscissa 68. The depth of field T is plotted on the ordinate 54. The unbroken line 67 corresponds to the full diaphragm opening and the broken line 66 results when the diaphragm diameter is reduced as stated above. It can be seen from FIG. 4 that by reducing the diaphragm diameter the user can increase the depth of field, but the diaphragm causes a reduction in the numerical aperture nA (FIG. 3) and as a result of equation (1) a loss of resolution.

Figure 5:
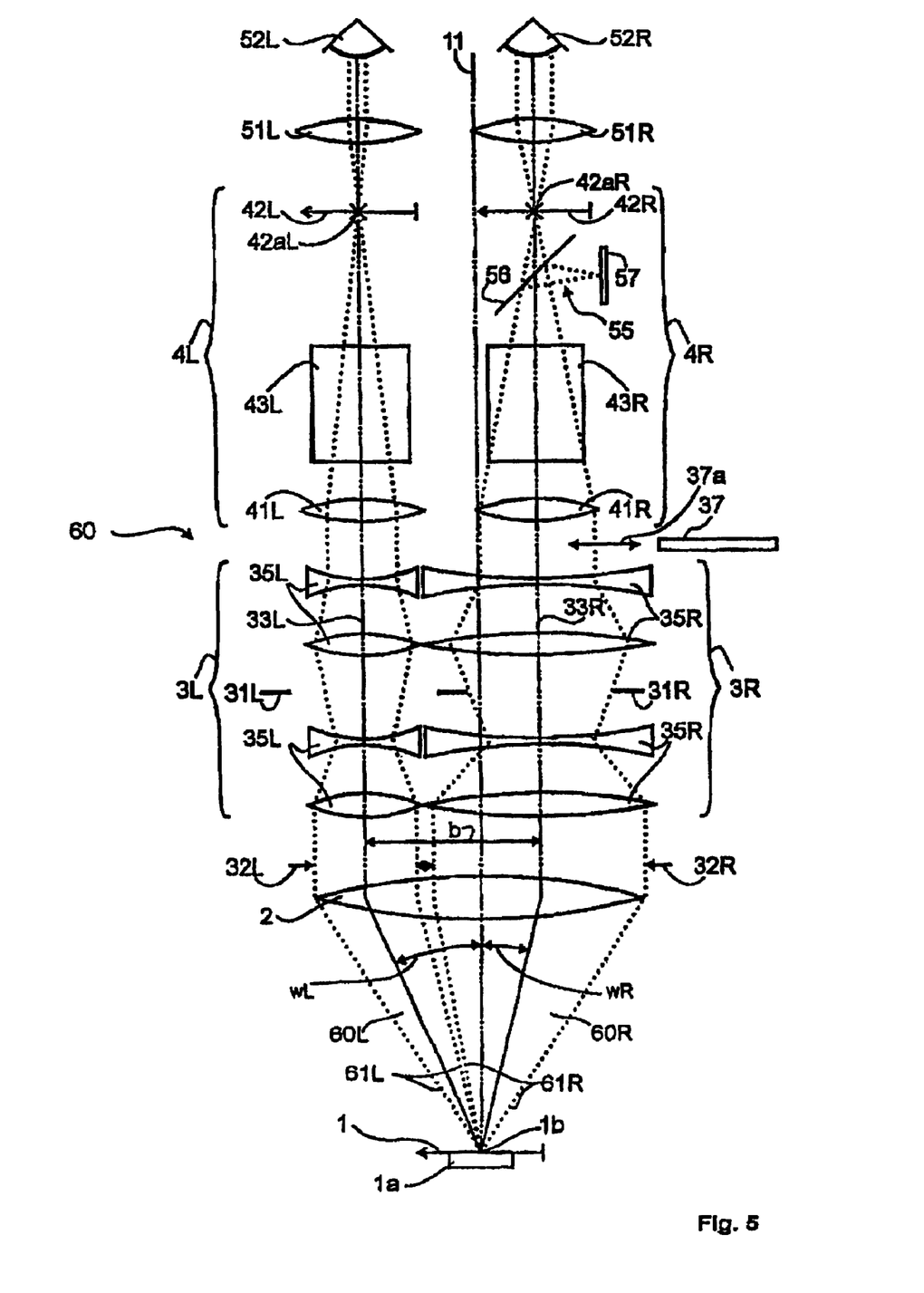
FIG. 5 illustrates schematically the optical design of a first embodiment of the invention.

FIG. 5 is a schematic representation of a first embodiment of the stereomicroscope 60 of the invention. The main objective, the stereo basis and the observation units are unchanged. Optical elements, which are identical to elements from FIG. 2, are denoted by the same references. The maximum magnification setting of the telescope system is shown. It can be seen that the diameter of the right beam path 60R is greater than that of the left 60L, in this example greater than the stereo basis b.

The invention concerns stereomicroscopes of the telescope type with telescope systems which—as already stated—can be designed as a step changer or zoom system. The two telescopes or telescope systems 3R and 3L are according to the invention no longer built symmetrically but are different, in particular, however, having at least different maximum diameters of the first entrance pupil 32R and the second entrance pupil 32L. Advantageously, the maximum diameter of the entrance pupil 32R or 32L of one telescope system 3R or 3L is 10-50% larger than that of the other telescope system 3L or 3R. The invention is particularly effective if the larger of the two diameters of the entrance pupils 32R or 32L is larger than the stereo basis b, which is possible if the diameter of the entrance pupil 32R or 32L of the other telescope system 3R or 3L is smaller than the stereo basis b.

The magnification changers or the zoom systems of the two telescope systems 3R and 3L, as explained below, can be designed in such a way that in the wide range of smaller microscope magnifications the diameters of the entrance pupils 32R and 32L of the two telescope systems 3R or 3L are virtually identical, but for high magnifications are different. By means of the unequal entrance pupil diameters the resolution can be increased without the disadvantages described above.

In the case according to the invention of the unequal diameters of the entrance pupils 32R and 32L the user receives two partial images of differing brightness, differing resolution and differing depth of field. Unexpectedly, it has been shown that a difference in brightness of up to 50% and the differences in the detail recognition do not adversely affect the visual perception and merging of the two partial images into a 3-dimensional image. On the contrary, surprisingly the object is perceived 3-dimensionally not only with the improved resolution resulting from the higher numerical aperture but also with the greater depth of field resulting from the lower aperture. The invention is based on the utilisation of this physiological phenomenon for the design of stereomicroscopes.

While in the first beam path 60R the pencil diameter is determined by the diameter of the iris diaphragm 31R, limitation of the second beam path 60L is by means of the diameter of the lens component 35L between objective 2 and diaphragm 31L. The objective 2 has a first and a second telescope system 3R and 3L which do not have the same design downstream of it. The optical elements 35R, 31R of the first telescope system 3R have a different diameter from the optical elements 35L, 31L of the second telescope system 3L. The telescope systems 3R and 3L are shown as afocal zoom systems.

The embodiment of the telescope systems 3R and 3L (right and left) may comprise different component parts. Here it should be noted that in the operated condition the rule of equal magnification always applies, that is to say the magnification of the two telescope systems is changed in unison.

A further possibility for the design of the first and second telescope systems 3R and 3L is for the first and second telescope systems 3R and 3L (right and left) to be designed with a "same construction", wherein, however, the optically effective diameter of at least one of the optical elements or a lens component of one of the two telescope systems is different to that at least of one of the optical elements or of a lens member of the other telescope system The term "optically effective diameter" means the diameter which describes the pencil of rays contributing to the image generation when they hit an optical element 35R, 35L and penetrate the optical element. With the "same construction" of the telescope systems in the case of an exemplary structure of a zoom system in accordance with Table 1 below, apart from the first lens group (surface numbers 101 to 105) the same parts are used for the remaining three groups on the right and on the left. This is economically expedient because of the possible higher production numbers. Also, for the first group, all manufacturing parameters are the same except for the diameter (see Table 1).

The first and the second telescope system 3R and 3L are preferably designed as afocal zoom systems, in particular such according to DE 102 22 041 B4 for a continuous magnification selection. As regards the structure and the function mode of such zoom systems express reference is made to the document mentioned, DE 102 22 041 B4—in order avoid repetitions.

The design of the first and the second telescope systems 3R and 3L (right and left) each with a diaphragm or iris diaphragm 31L, 31R is illustrated. Here the first diaphragm 31R in the first telescope system 3R can be operated independently of the second diaphragm, 31L in the second telescope system 3L. Telescope systems without any diaphragm can also be used.

In a further embodiment of the diaphragm setting the operation of the diaphragms 31R, 31L is set in such a way that in a first setting the ratio of the diaphragm openings between the first telescope system 3R and the second telescope system 3L is set. In a second setting both diaphragm openings (with the ratio unchanged) are varied simultaneously.

Similarly through the introduction of a light filter (for example neutral density stage or graduated filter) in the beam path with the larger diameter of the entrance pupils the differences in brightness resulting from the diameter differences can be reduced or eliminated. Here the filter 37 is advantageously arranged in any of: between the main objective 2 and the telescope system 3, in the telescope system, or between the telescope system and the eyepiece as shown in FIG. 5. The filter 37 can be operated manually and introduced into the beam path along the double arrow 37a illustrated in FIG. 5. It is likewise possible for the filter 37 to be varied in its position and thus its filter properties by an operation controlled by the magnification selection. The filter does not adversely affect the resolution or the depth of field.

In a further embodiment the stereomicroscope is provided with a documentation port 55. By arranging a beam splitter 56 or a decoupling device in the first beam path 60R with the larger diameter 32R of the entrance pupil, the decoupling is achieved. Thus, the high resolution of the documentation device 57 is made present. The documentation device 57 is a conventional CCD camera or a conventional sensor surface.

Further, the first and/or the second telescope system 3R, 3L can be designed to swivel about its longitudinal axis, so that the beam path with the larger diameter of the entrance pupils 32R can optionally be supplied to the right or the left eye 52R or 52L of the user.

The invention has a particular advantage in high power stereomicroscopes, wherein high magnifications and thus also high resolutions are required, in order to prevent a so-called empty magnification (increase of the magnification with constant resolution, that is to say, without increase in the detail recognition). The magnification ratio Vmax/Vmin should be greater than 10 in stereomicroscopes. Zoom systems with a zoom factor z>10 are normal for this purpose. From the ratios described the invention is particularly effective.

Figure 6:
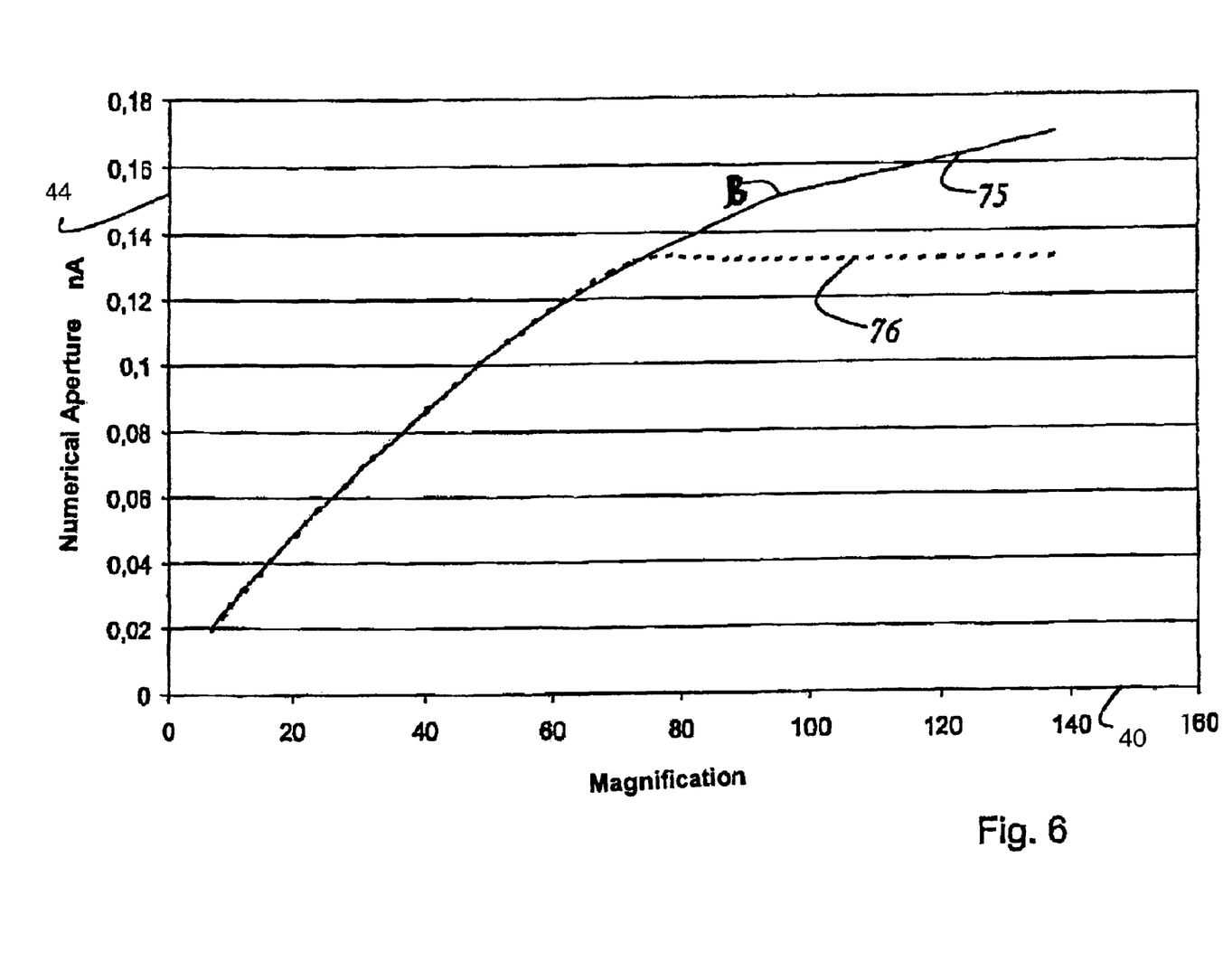
FIG. 6 shows the progression of the numerical aperture nA as a function of the magnification.
Figure 7:
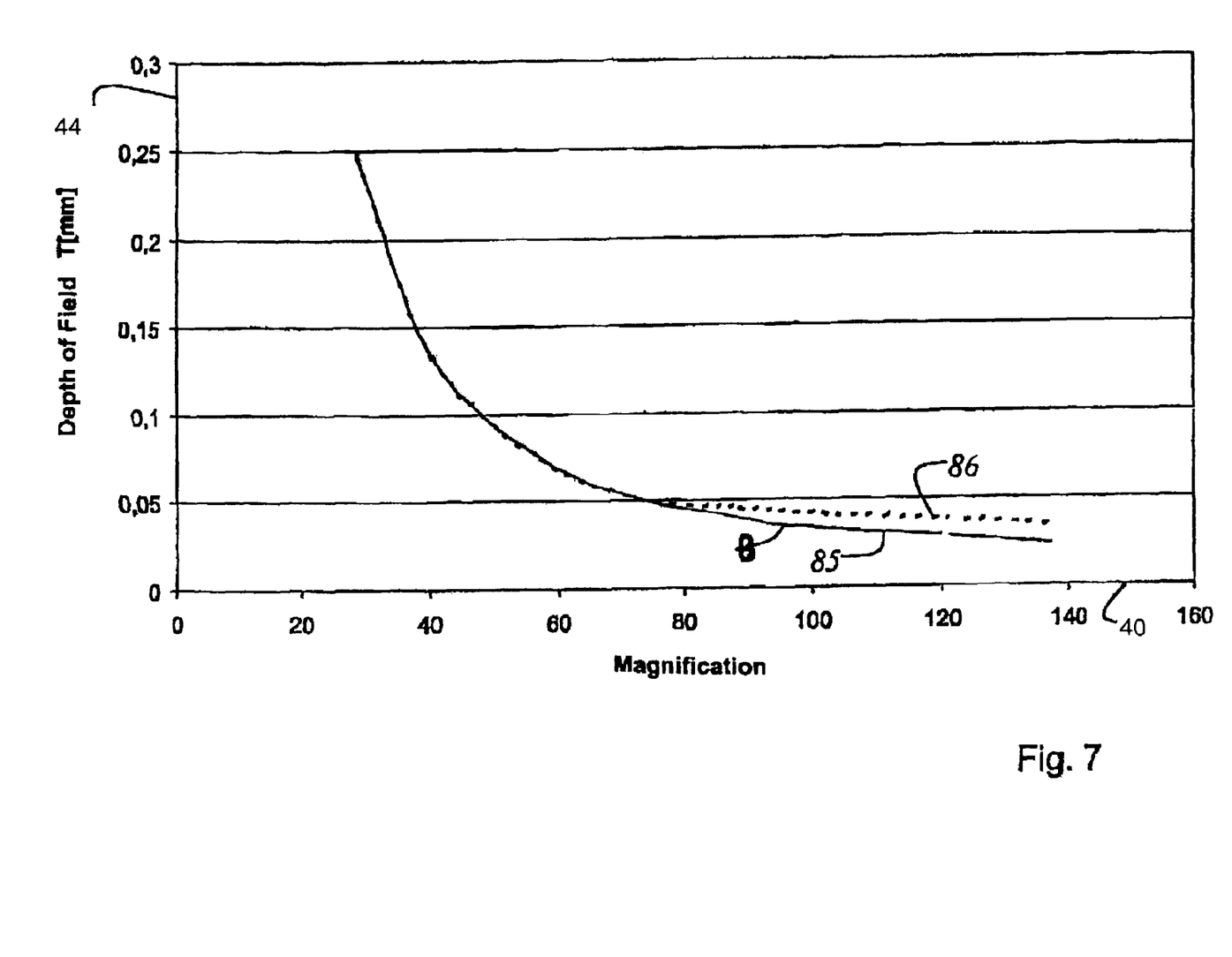
FIG. 7 shows the progression of the depth of field T as a function of the magnification.

FIGS. 6 and 7 show the course of the numerical aperture nA and the depth of field T for an embodiment with maximum diameter EP=27 mm on the right side and maximum diameter EP=21 mm on the left side. Again a focal length of the main objective of $f_O'$=80 mm, a tube focal length $f_T$=160 mm, a stereo basis b=24 mm and an eyepiece magnification of 10× are selected. The unbroken line 75 on FIG. 6 arises for the beam path with the large diameter 32R, and the broken line 76 for the beam path with the smaller diameter 32L. The unbroken line 85 in FIG. 7 arises from for the beam path with the large diameter 32R, and the broken line 86 for the beam path with the smaller diameter 32L. It can be seen from FIG. 6 that there is a gain in numerical aperture nA—and thus resolution—and on FIG. 7 that there is a gain in depth of field T compared with the prior art. The points B in FIGS. 6 and 7 mark the point on the curve that can be reached if according to the prior art both systems were constructed symmetrically with the maximum possible pencil diameter 32R=32L=stereo basis b=24 mm. Even compared to this theoretical limiting case an improvement in resolution and depth of field is demonstrated.

FIGS. 6 and 7 correspond to an embodiment in which the entrance pupil diameter of 21 mm on the left side is limited by a lens diameter. Since the entrance pupil diameter becomes smaller as magnification reduces, both stereoscopic channels in a wide magnification range of low magnifications have the same effective diameter. Therefore, no differences in resolution and depth of field arise between both channels for such magnifications. Only at high magnifications, in which the diameter of the entrance pupil of the larger channel exceeds the diameter of the limiting lens mentioned of the smaller channel, do the apertures become asymmetric and two different curves develop, which demonstrate the advantage of the invention concerning resolution and depth of field in relation to the prior art.

The angles wR and wL are unequal in the embodiment in FIG. 5. Here the objective axis 11 and the axis 50a of the cylinder 50 defining the telescope (see FIG. 8b) coincide. The observation angle wR through the right-hand beam path 60R with the higher entrance pupil diameter 31R is smaller than with a symmetrical construction (see FIG. 8a). As a consequence of this an object placed centrically to the main objective appears as though viewed slightly from the side. In practice this does not have a disadvantage of any significance when viewing elongated objects.

Data on the two zoom systems can be found in U.S. Pat. No. 6,816,321 B2, (=DE 102 22 041 B4), Table 3. The data is expanded in the table and the optically effective diameters for the right and left beam paths 60R and 60L are listed. Each zoom system consists of four groups of lenses (see FIGS. 9 and 10), the lens surfaces of which are designated with 101 to 105, 106 to 110, 111 to 115 and 116 to 118. Here the values shown in Table 1 below refer to a specific embodiment of the invention.

FIG. 8 shows the effect of the positioning of the main objective 2 relative to the telescope systems on the two observation angles wL and wR.

FIG. 8a shows a first setting possibility for the positioning of the main objective 2. Here the two observation directions are arranged symmetrically to the optical axis 11 of the objective 2 (wL=wR). This position is referred to below as a "symmetrical arrangement". This is advantageous for coaxial illumination of reflecting objects from above. In such an embodiment of the lighting known per se, illumination light beneath the tube lenses (41L, 41R in FIG. 5) is conducted into both stereoscopic channels by means of a beam splitter and directed through the channels and the main objective onto the object. Only if wR and wL are symmetrical, can the light directed onto the object by a channel and reflected there be picked up by the other channel and the object observed in this way.

FIG. 8b shows the positioning of the main objective 2 in such a way that the optical axis of the main objective 2 lies closer to the optical axis 33R of the telescope system 3R with the larger entrance pupil diameter. As a consequence of the position of the main objective 2, shown in FIG. 8b, this possesses an advantageously small objective diameter. Here the optical axis 11 of the main objective 2 and the axis 50a of the cylinder 50 defining the telescope systems 3R and 3L coincide. Here the observation angle wR through the channel 60R with the higher diameter 32R of the entrance pupil is less than in the symmetrical structure (see FIG. 8a). If wR<wL (or, more generally, wR unequal to wL) this embodiment is to

TABLE 1

| Surface number | Radius [mm] | Distance [mm] | $n_d$ | $v_d$ | $P_{g,F}$ | $P_{C,t}$ | ØRight [mm] | ØLeft [mm] |
|---|---|---|---|---|---|---|---|---|
| 101 | 102.52 | 5.07 | 1.49700 | 81.6 | 0.5375 | 0.8236 | 27.0 | 21.0 |
| 102 | −42.42 | 2.0 | 1.74400 | 44.8 | 0.5655 | 0.7507 | 26.9 | 20.9 |
| 103 | −312.91 | 0.1 | | | | | 26.9 | 20.9 |
| 104 | 76.50 | 4.05 | 1.49700 | 81.6 | 0.5375 | 0.8236 | 26.9 | 20.9 |
| 105 | −102.65 | D1 | | | | | 26.9 | 20.6 |
| | | 49.35 ÷ 9.02 | | | | | | |
| 106 | −46.18 | 1.5 | 1.48749 | 70.2 | 0.5300 | 0.8924 | 11.3 | 11.3 |
| 107 | 20.39 | 1.96 | | | | | 10.5 | 10.5 |
| 108 | −46.61 | 1.2 | 1.62041 | 60.3 | 0.5427 | 0.8291 | 10.2 | 10.2 |
| 109 | 13.60 | 2.67 | 1.78470 | 26.3 | 0.6135 | 0.6726 | 10.1 | 10.1 |
| 110 | 40.59 | D2 | | | | | 9.8 | 9.8 |
| | | 5.26 ÷ 88.89 | | | | | | |
| 111 | 44.20 | 2.35 | 1.49700 | 81.6 | 0.5375 | 0.8236 | 13.0 | 13.0 |
| 112 | −58.28 | 0.1 | | | | | 13.1 | 13.1 |
| 113 | 32.66 | 5.13 | 1.74950 | 35.3 | 0.5869 | 0.7140 | 13.1 | 13.1 |
| 114 | 15.09 | 2.99 | 1.49700 | 81.6 | 0.5375 | 0.8236 | 12.1 | 12.1 |
| 115 | 437.12 | D3 | | | | | 12.0 | 12.0 |
| | | 50.13 ÷ 6.83 | | | | | | |
| 116 | −29.87 | 4.95 | 1.67270 | 32.1 | 0.5988 | 0.7046 | 10.4 | 10.4 |
| 117 | −15.67 | 1.2 | 1.51633 | 64.1 | 0.5353 | 0.8687 | 10.7 | 10.7 |
| 118 | 43.26 | | | | | | 10.7 | 10.7 |

From left to right, the lines of Table 1 list the surface number, the radius of curvature, the distance from the next surface, the refractive index $n_d$, the dispersion $v_d$, the partial dispersions $P_{g,F}$ and $P_{C,t}$, and the optically effective diameters of the right and left beam path or the first and second telescope systems 3R and 3L. $n_d$ denotes the refractive index, $v_d=(n_d-1)/(n_F-n_C)$ is the Abbe coefficient, $P_{g,F}=(n_g-n_F)/(n_F-n_C)$ is the relative partial dispersion for the wavelengths g and F, and $P_{C,t}=(n_C-n_t)/(n_F-n_C)$ is the relative partial dispersion for the wavelengths C and t. An air gap is identified by an empty line or no entry for the material details.

be called an "asymmetrical arrangement". The smaller observation angle and the small diameter of the main objective 2 simplify the design of the main objective 2 despite the unilateral magnification of the numerical aperture. Therefore, the asymmetrical arrangement is particularly preferred.

A main objective with the small diameter in accordance with the "asymmetrical arrangement" can also be used in the "symmetrical arrangement" with coaxial illumination from above. Because the light from the light source, as explained previously, always travels through both channels to the observer, the smaller of the two entrance pupil diameters is always effective. It is therefore possible to use in the "symmetrical position" a main objective with the small diameter, which results from the "asymmetrical arrangement", without vignetting occurring.

FIG. 8c is the special case in which the optical axis 11 of the main objective 2 and the optical axis 33R of the telescope system 3R coincide with the larger entrance pupil diameter. Here no stereoscopic observation is provided for. The observation angle is 0°. This setting is particularly advantageous for documentation and measurement tasks at high resolution. Since here only one stereoscopic channel contributes to the image, it is likewise possible to use a main objective with the small diameter, which results from the "asymmetrical arrangement".

Similarly, the main objective 2 can be designed to be laterally displaceable. Thus variable positioning of the main objective 2 relative to the magnification changer (or to the first and second telescope system 3R and 3L) is achieved. The positions described in FIGS. 8a to 8c of the main objective 2 can be optionally set. It is mentioned for the sake of completeness that in practice the telescope system with the tube is advantageously displaced opposite the stationary main objective, in order to prevent a displacement of the object.

Figure 9:
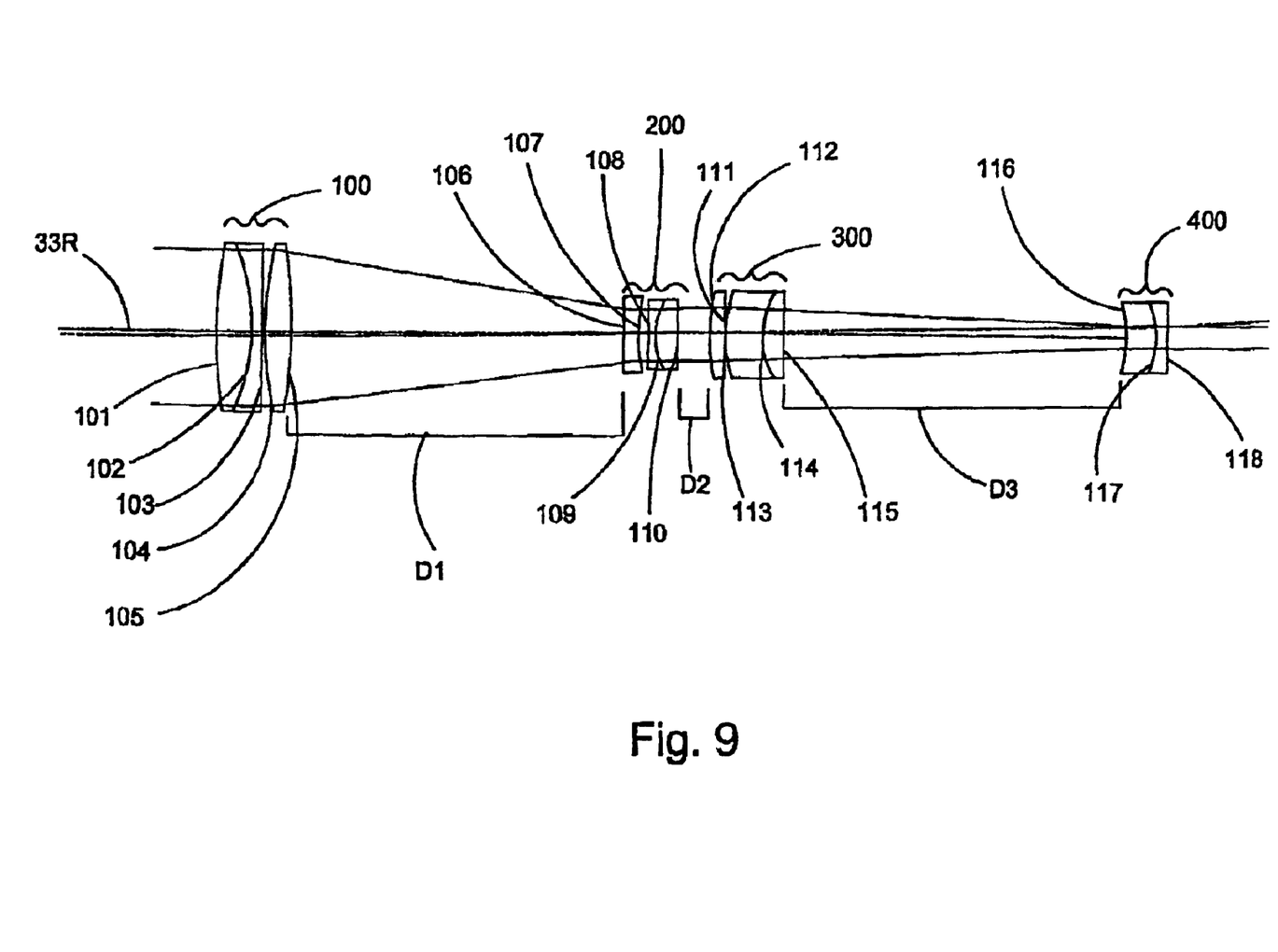
FIG. 9 shows the beam path of the first telescope system at maximum magnification.
Figure 10:
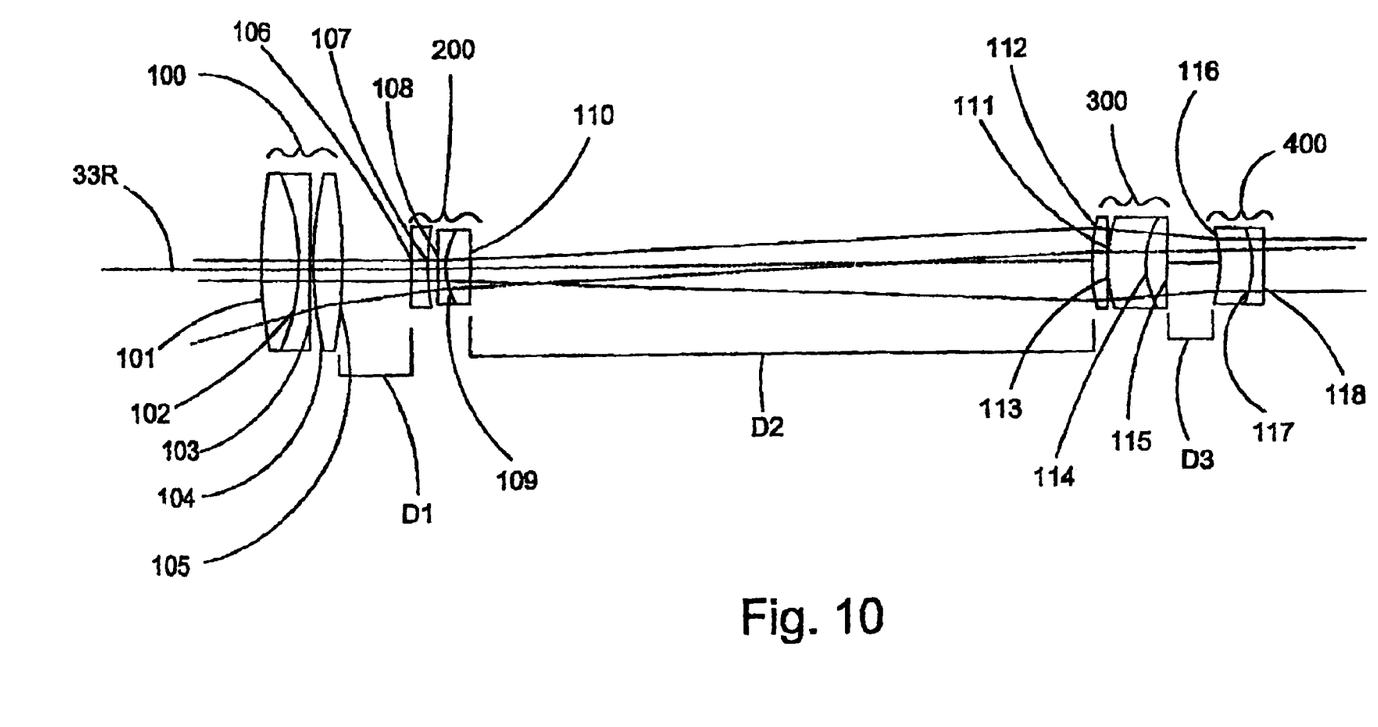
FIG. 10 shows the beam path of the first telescope system at minimum magnification.

FIGS. 9 and 10 show the beam path of the first telescope system 3R at the maximum magnification and at the minimum magnification. FIG. 9 shows the maximum magnification. FIG. 10 shows the minimum magnification. The first and second telescope systems 3R and 3L are built from a first lens group 100, a second lens group 200, a third lens group 300 and a fourth lens group 400 (see Table 1 above). D1, D2 and D3 denote the variable distances between the lens groups 100, 200, 300 and 400. Between the first lens group 100 and the second lens group 200 at maximum magnification the distance D1=49.35 mm. Between the second lens group 200 and the third lens group 300 at maximum magnification the distance D2=5.26 mm. Between the third lens group 300 and the fourth lens group 400 at maximum magnification the distance D3=50.13 mm. At minimum magnification the composition of the distances is different. Between the first lens group 100 and the second lens group 200 at minimum magnification the distance D1 is 9.02 mm. Between the second lens group 200 and the third lens group 300 at minimum magnification the distance D2 is 88.89 mm. Between the third lens group 300 and the fourth lens group 400 at minimum magnification the distance D3 is 6.83 mm. Table 1 shows the radii of the surface numbers in the groups of lenses, as illustrated in FIG. 9 and FIG. 10. The table also shows that the objective-side diameters ø of the refracting elements of the first telescope system 3R are greater than the diameters ø of the refracting elements of the second telescope system 3L. The edge beams which define the diameter of the entrance pupil are illustrated as an unbroken line and the main beam for the maximum field angle as a broken line. See in this respect as well as with regard to the individual elements with their reference symbols the description of FIGS. 1a and 1b of DE 102 22 041 B4 already mentioned.

It is recognized in FIG. 10 that the main beam has a considerable distance to the outside diameter of the group 100, while in FIG. 9 the edge beams in the case of the same group 100 run close to the outside diameter. It is thus obvious that in the left telescope 3L of the left channel the diameter of the group 100 can be reduced without the main beam being blocked as a result. This is the one necessary condition for stereoscopic viewing to be possible up to the image edge. This condition that the main beam to the image edge must not be blocked in the channel with the smaller diameter, is simultaneously a criterion for the design of an afocal zoom system suitable for a stereomicroscope of unequal optically effective channel diameters. This condition is thus a guide for positioning of the entrance pupil with low magnifications.

What is claimed is:

1. A telescopic stereomicroscope comprising:
   a first beam path;
   a second beam path;
   a common main objective allocated to both the first and second beam paths;
   a first telescope system being disposed in the first beam path having a first optical element and a first magnification;
   a second telescope system disposed in the second beam path and having a second optical element corresponding to the first optical element and a second magnification, wherein the first and second magnifications are equal and are adjustable synchronously to each other, and wherein the first optical element has a different optically effective diameter than the corresponding second optical element;
   a first observation unit disposed in the first beam path downstream of the first telescope system and configured to convey light of the first beam path forming a first partial image of a three dimensional image to a first eye of a user; and
   a second observation unit disposed in the second beam path downstream of the second telescope system and configured to convey light of the second beam path forming a second partial image of the three-dimensional image to a second eye of the user, such that the first and second beam paths extending from the telescope systems to the user's eyes have different optically effective diameters, such that the first partial image and the second partial image have different resolution and depth of field.

2. The telescopic stereomicroscope as recited in claim 1, wherein the first optical element includes at least one of a lens element and a diaphragm.

3. The telescopic stereomicroscope as recited in claim 1, wherein a diameter of a first entrance pupil of the first telescope system is more than 10% greater than a diameter of a second entrance pupil of the second telescope system for at least one of a magnification setting and a zoom range of the first and second telescope systems.

4. The telescopic stereomicroscope as recited in claim 3, wherein the diameter of the first entrance pupil is 10% to 50% greater than the diameter of the second entrance pupil for the at least one of the magnification setting and the zoom range of the first and second telescope systems.

5. The telescopic stereomicroscope as recited in claim 1, wherein a maximum magnification setting of the first and second telescope systems, a diameter of a first entrance pupil of the first telescope system is more than 10% greater than a diameter of a second entrance pupil of the second telescope system.

6. The telescopic stereomicroscope as recited in claim 1, wherein the first telescope system defines an optical axis and the second telescope system defines a second optical axis, wherein a distance between the first and second optical axes defines a stereo basis and wherein a diameter of a first entrance pupil of the first telescope system is greater than the stereo basis.

7. The telescopic stereomicroscope as recited in claim 1, wherein the first telescope system defines a first optical axis, the second telescope system defines a second optical axis and the main objective defines a main objective optical axis, wherein a first distance from the main objective optical axis to the first optical axis and a second distance from the main objective optical axis to the second optical axis are the same.

8. The telescopic stereomicroscope as recited in claim 1, wherein the first telescope system has one of a greater optically effective diameter and a larger entrance pupil than the second telescope system, wherein the first telescope system defines a first optical axis, the second telescope system defines a second optical axis and the main objective defines a main objective optical axis, and wherein the telescopic stereomicroscope includes a viewing position in which a first distance from the main objective optical axis to the first optical axis is greater than zero and smaller than a second distance from the main objective optical axis to the second optical axis.

9. The telescopic stereomicroscope as recited in claim 1, wherein the main objective defines a main objective optical axis, the main objective optical axis coincides with an optical axis of the telescope system having a larger optically effective diameter or larger entrance pupil diameter.

10. The telescopic stereomicroscope as recited in claim 1, wherein the main objective defines a main objective optical axis and wherein the main objective and the first and second telescope systems are displaceably arranged laterally relative to each other or perpendicularly to the main objective optical axis.

11. The telescopic stereomicroscope as recited in claim 1, further comprising a documentation device and at least one of a beam splitter and a decoupling device disposed in the first beam path having larger entrance pupil diameter providing decoupling of the beam to the documentation device at high resolution.

12. The telescopic stereomicroscope as recited in claim 1, wherein the first and the second telescope systems are configured to swivel about a longitudinal axis, so that a beam path of the first and second beam paths having a larger entrance pupil diameter is adjustable to correspond to a left or right eye of a user.

13. The telescopic stereomicroscope as recited in claim 1, wherein a magnification ratio between maximum and minimum magnification of the first and second telescope systems is greater than ten.

14. The telescopic stereomicroscope as recited in claim 1, wherein the first telescope system defines a first optical axis, the second telescope system defines a second optical axis and the main objective defines a main objective optical axis, wherein the first optical element has a larger optically effective diameter than the corresponding second optical element, and wherein the main objective and a combination of the first and second telescope systems are displaceably arranged laterally relative to each other so as to form at least three viewing positions including:
   a first viewing position in which a first distance from the main objective optical axis to the first optical axis and a second distance from the main objective optical axis to the second optical axis are the same;
   a second viewing position in which a third distance from the main objective optical axis to the first optical axis is greater than zero and smaller than a fourth distance from the main objective optical axis to the second optical axis; and
   a third viewing position in which the main objective optical axis coincides with the first optical axis.

15. A telescopic stereomicroscope comprising:
   a first beam path;
   a second beam path;
   a first observation unit and a second observation unit, the first observation unit being disposed in the first beam path and configured to convey light of the first beam path to a first eye of a user, and the second observation unit being disposed in the second beam path and configured to convey light of the second beam path to a second eye of the user;
   a first telescope system being disposed in the first beam path having a first optical element and a first magnification;
   a second telescope system disposed in the second beam path and having a second optical element corresponding to the first optical element and a second magnification, wherein the first and second magnifications are equal and are adjustable synchronously to each other, and wherein the first optical element has a different optically effective diameter than the corresponding second optical element; and
   a common main objective allocated to both the first and second beam paths; wherein the first and second telescope systems each include a respective plurality of groups of lenses, wherein the first and second optical elements each correspond to a respective first group of the respective groups of lenses, and wherein the remaining groups of lenses in the first telescope system are the same as the remaining groups of lenses in the second telescope system.

16. The telescopic stereomicroscope as recited in claim 15, wherein a refractive index, Abbe coefficient, relative partial dispersion for wavelengths g and F, and relative partial dispersion for wavelengths C and t of components of the first optical element are the same as those of respective components of the second optical element.

17. A telescopic stereomicroscope comprising:
   a first beam path;
   a second beam path;
   a common main objective allocated to both the first and second beam paths;
   a first telescope system being disposed in the first beam path having a first optical element and a first magnification;
   a second telescope system disposed in the second beam path and having a second optical element corresponding to the first optical element and a second magnification, wherein the first and second magnifications are equal and are adjustable synchronously to each other, and wherein the first optical element has a different optically effective diameter than the corresponding second optical element;
   a first observation unit disposed in the first beam path downstream of the first telescope system and configured to convey light of the first beam path forming a first partial image of a three dimensional image to a first eye of a user; and
   a second observation unit disposed in the second beam path downstream of the second telescope system and configured to convey light of the second beam path forming a second partial image of the three-dimensional image to a second eye of the user,
   wherein the first telescope system defines an optical axis and the second telescope system defines a second optical axis, wherein a distance between the first and second optical axes defines a stereo basis and wherein a diameter of a first entrance pupil of the first telescope system is greater than the stereo basis.

* * * * *